(No Model.)

J. A. MORRELL.
APPARATUS FOR EVAPORATING LIQUIDS.

No. 441,320. Patented Nov. 25, 1890.

WITNESSES:

INVENTOR
James A. Morrell
by
ATTORNEY

UNITED STATES PATENT OFFICE.

JAMES A. MORRELL, OF LANSDALE, ASSIGNOR OF ONE-HALF TO GIDEON W. MARSH, OF PHILADELPHIA, PENNSYLVANIA.

APPARATUS FOR EVAPORATING LIQUIDS.

SPECIFICATION forming part of Letters Patent No. 441,320, dated November 25, 1890.

Application filed December 13, 1888. Renewed April 1, 1890. Serial No. 346,174. (No model.)

*To all whom it may concern:*

Be it known that I, JAMES A. MORRELL, a citizen of the United States, residing at Lansdale, in the county of Montgomery and State of Pennsylvania, have invented certain new and useful Improvements in Apparatus for Evaporating Liquids and Concentrating Solutions; and I do hereby declare the following to be a sufficiently full, clear, and exact description thereof as to enable others skilled in the art to make and use the said invention.

This invention relates to apparatus for concentrating solutions by evaporation, and has for its object the expeditious concentration of solutions with diminished risk of deterioration.

This invention consists in a combination and arrangement of vessels and tubes, hereinafter described, and shown in the accompanying drawings.

Figure 1:
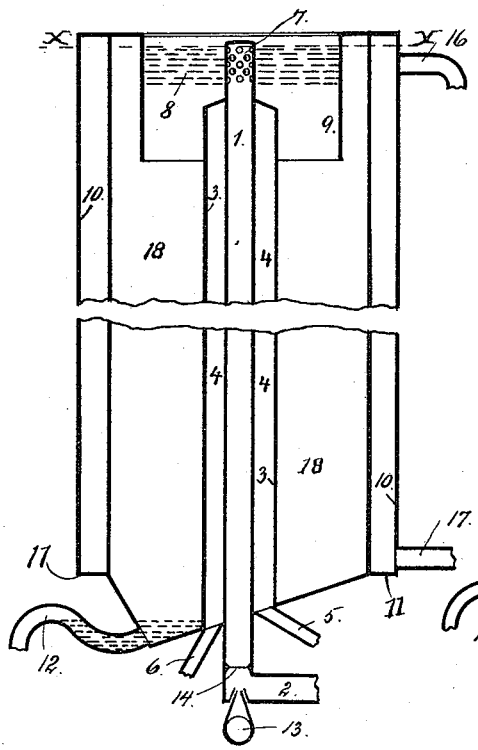
Figure 3:
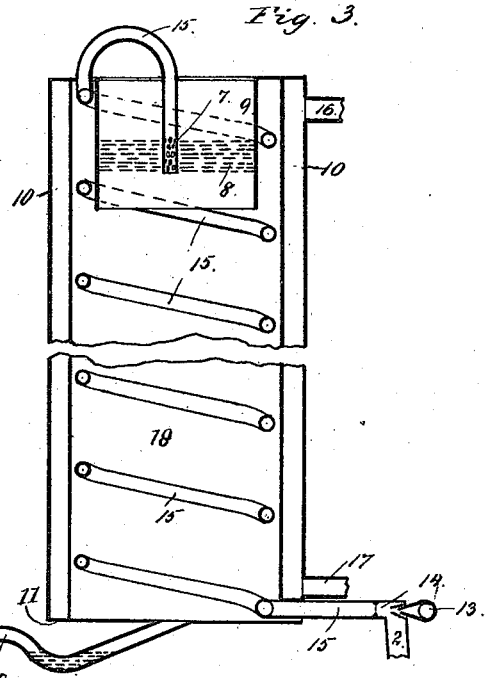
Figure 2:
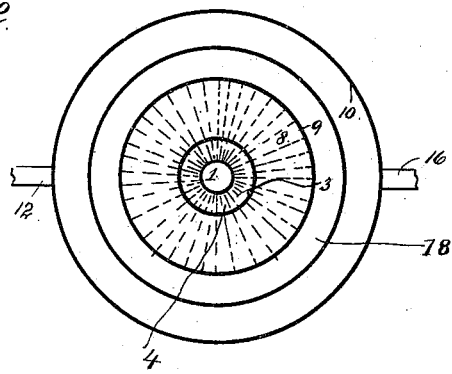

Figure 1 shows a vertical section; Fig. 2, a sectional view taken on the line $x\ x$ of Fig. 1, and Fig. 3 a vertical section of a modified form of my apparatus.

The same reference-marks indicate like parts in the several figures.

1 is a vertical pipe receiving a supply of liquid at the lower end through a branch 2 under a sufficient pressure to overcome the elastic force of vapors and gas or air at the temperature to which the liquid is heated.

3 is a closed jacket surrounding the pipe 1, with a space 4 included, which is kept constantly hot by superheated steam or other heated fluid introduced through pipe 5 at a temperature above the boiling-point of the solution in the tube 1. A similar pipe 6 is employed for the withdrawal of water of condensation.

The upper end of the tube 1 projects above the jacket 3 and is closed at the top, and has in its periphery above the jacket 3 minute perforations 7, from which jets or sprays 8 of the solution are forcibly ejected horizontally against a cylindric screen 9. Surrounding the screen 9, at some little distance from it, is a cylindric chamber 10, which extends downwardly nearly the entire length of the apparatus and is closed at its top and at the base 11. The chamber 18 is open at its top, and at or near its bottom is provided with a trap-pipe 12, through which liquid may be drawn off without admitting a circulation or draft of air within said chamber.

The outer wall of the chamber 10 is clothed to avoid waste of heat by radiation, and said chamber is continuously supplied with fluid at a temperature above the boiling-point of the solution to be concentrated by means of pipe 16. A similar pipe 17 is provided for the withdrawal of water of condensation.

An injector 14 is inserted in the pipe 2, through which air or gas under pressure from a pipe 13 is forced into the pipe 1 with the solution. The modified form of the apparatus shown in Fig. 3 has a helical pipe 15 substituted for the central pipe 1 and the jacket 3, the helical pipe 15 being coiled near the inner wall of the chamber 10, from which it derives its heat. The upper end of the pipe 15 is bent upward and thence radially to the center of the chamber 18, and then downward a short distance, being closed at the end and having its periphery perforated near the end with minute apertures 7, through which the hot fluid is dispersed radially in a fine spray upon the screen 9, and, descending, is exposed to further heating from the radiation of heat from the internal wall of the chamber 10. During its descent it parts with its moisture very rapidly, and when it is collected sufficiently at the base is withdrawn through the trap-pipe 12.

Having described this invention and the operation thereof, what I claim is—

In a liquid-concentrating apparatus, the combination, with an evaporating-chamber, of an inclosing steam-chamber, a liquid-feed pipe perforated at its upper end and provided with a gas-injector at its lower end, and a depending screen surrounding the perforated end of the feed-pipe to receive the liquid sprayed therethrough, said feed-pipe extending through the evaporating-chamber, whereby the liquid becomes highly heated before being sprayed into the said chamber, substantially as described.

JAMES A. MORRELL.

Witnesses:
LUTHER L. CHENEY,
H. B. S. MORRELL.